(No Model.)

J. H. BOLLES.
ROTARY CUTTER FOR DREDGERS.

No. 331,861. Patented Dec. 8, 1885.

Witnesses,
Geo. H. Strong
J. H. Nourse

Inventor,
J. H. Bolles
By Dewey & Co.
Attorneys

UNITED STATES PATENT OFFICE.

JOHN H. BOLLES, OF SAN FRANCISCO, CALIFORNIA, ASSIGNOR OF ONE-THIRD TO JOHN N. S. WILLIAMS, OF SAME PLACE.

ROTARY CUTTER FOR DREDGERS.

SPECIFICATION forming part of Letters Patent No. 331,861, dated December 8, 1885.

Application filed October 16, 1884. Renewed October 7, 1885. Serial No. 179,263. (No model.)

*To all whom it may concern:*

Be it known that I, JOHN H. BOLLES, of the city and county of San Francisco, and State of California, have invented an Improvement in Rotary Cutters for Dredgers; and I hereby declare the following to be a full, clear, and exact description thereof.

My invention relates to certain new and useful improvements in rotary cutters for dredging-machines in which an outer drum, carrying the buckets, rotates on an inner drum provided with a reservoir communicating with the suction-pipe and the buckets; and my invention consists in a peculiar and novel construction and arrangement of the buckets and in a rotary adjustment of the inner drum, all of which I shall hereinafter fully describe.

Figure 1:
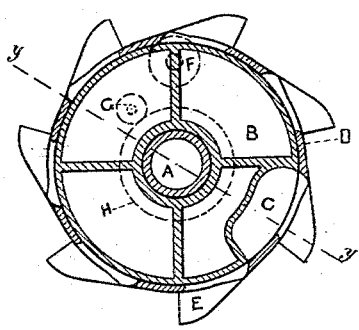
Figure 2:
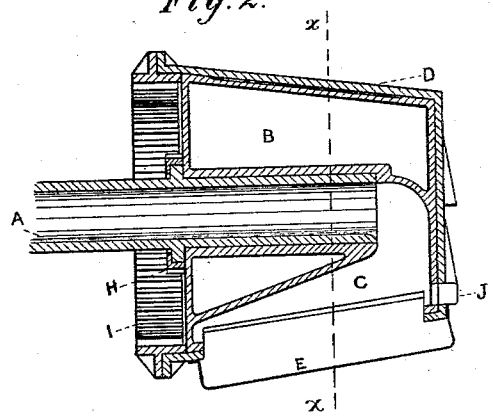
Figure 3:
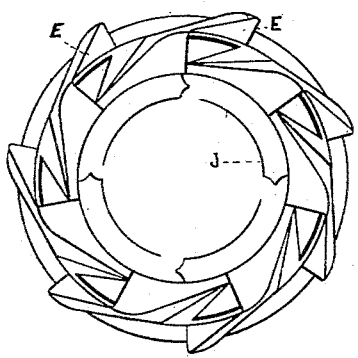
Figure 4:
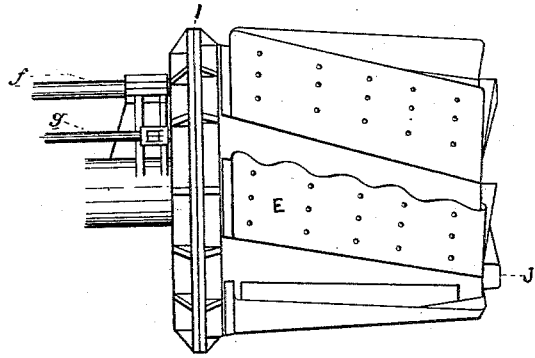

The object of my invention will appear fully in the course of the following description:

Referring to the accompanying drawings, Figure 1 is a cross-section of the cutter, taken on line $xx$, Fig. 2. Fig. 2 is a longitudinal section taken on line $yy$, Fig. 1. Fig. 3 is an end view of the cutter. Fig. 4 is a side elevation of same.

A is the suction-pipe, which extends from the dredger. Upon its lower end is mounted the inner drum, B, which is provided with a reservoir, C, communicating with the suction-pipe, as shown in Fig. 2.

D is the outer drum, provided on its face with a series of buckets, E. These buckets, it will be observed upon reference to Fig. 4, are perforated, and extend the entire length of the face of the outer drum, D, to which they are attached. The buckets may be arranged in straight lines across the face of the drum, or, as shown in Fig. 4, they may be set spirally or at an angle with the axis of revolution of the drum to which they are secured, or in any combination of straight and curved lines, as may be found suitable for the required work. I may in some cases break or serrate the edges of the buckets, as shown in one instance in Fig. 4.

Upon the end of the outer drum are the usual buckets, J, which communicate, as shown in Fig. 2, with the reservoir C of the inner drum. The outer drum is rotated in the usual manner by means of the internal gear, I, Fig. 2, with which meshes the pinion F, Fig. 1, on a shaft, $f$, Fig. 4, which extends to the dredger, and is driven in any suitable manner. The inner drum, B, is so mounted upon the end of the suction-pipe that it may be given a rotary adjustment, which is effected by means of the gear H and the pinion G, Fig. 1, on a shaft, $g$, Fig. 4, which extends inboard, and may be provided with suitable hand-gear and locking mechanism, so contrived that when locked the drum is incapable of motion on its axis.

The reasons for each of the various constructions herein described are as follows: The perforations in the buckets E are to afford unusual facility for the discharge of the material taken into them, thereby increasing the capacity in cutting and delivering material to the suction-pipe. This is attained by reason of the perforations preventing any vacuum being formed behind the material while discharging, the water following the line of penetration made by the edge of the bucket as it cuts the material in place, and, passing through the perforations with a force due to the action of the pump and its own head, will cause a rapid and complete discharge of material from the buckets into the reservoir. These perforations are to be of any required number, shape, or size. By extending the bucket the whole length of the face of the drum it not only reaches the greatest area for its operation in cutting, but avoids the friction which is encountered by and between the detached buckets of an ordinary dredger-cutter from the bed of the material in place through which they pass, and, also, in connection with the movable inner drum, these extended buckets supply a continuous and regular discharge of material to the suction-pipe.

The spiral form of the bucket by reason of its curve at once cuts into the material to which it is applied, and, gaining depth as it progresses, causes the whole of the cutter to be held firmly down to the material being cut, and at the same time braces and steadies the whole machinery, and as its pressure tendency is back toward the boat the driving-shaft and gear to the drum are relieved from the strain of extension.

When, as is shown in one of the buckets in Fig. 4, an irregular line is given to the cutting-edge, by which a series of points on the line of first contact occur, the water, following the line of penetration at these points, first softens and partially detaches the material attacked before the full edge of the bucket has entered the material in place; and also by said irregularity in the cutting-edge of the bucket a displacing and cutting force irregular in its operation at different points along the edge of the bucket is obtained, and the material in place, when of a friable character, is effectually disintegrated, and more rapidly and in greater quantities taken into the buckets.

The improvement to the cutter effected by the movable inner drum chiefly results from its movable adaptation to the area of discharge of material from the buckets into the reservoir, whereby it is enabled to regulate the proportions of material or water supplied through the buckets in such a manner that the proportion of either water or material may be increased or diminished to any desired extent. This result is produced by so regulating the position of the reservoir C that the buckets shall remain in communication with it while passing through the material only, whereby a full charge of material is supplied, or by so changing the position of said reservoir that during a portion of the time of such communication the buckets shall pass through the water, whereby a proportion of water as well as material is supplied.

Having thus described my invention, what I claim as new, and desire to secure by Letters Patent, is—

1. In a rotary cutter for dredging-machines, having an inner drum, B, with a reservoir, C, communicating with the suction-pipe, and a rotating outer drum, the buckets E, carried by said drum, each bucket extending the entire length of the face of said drum, substantially as herein described.

2. In a rotating cutter for dredging-machines, having an inner drum with a reservoir communicating with the suction-pipe, and a rotating outer drum, the buckets E, carried by said drum, each bucket extending the entire length of the face of the drum, and arranged thereon spirally or at an angle with the axis of said drum, substantially as herein described.

3. In a rotary cutter for dredging-machines, having an inner drum with a reservoir communicating with the suction-pipe, and a rotating outer drum, the buckets E, carried by the outer drum, said buckets having a broken or serrated edge and extending the entire length of the face of the drum, substantially as herein described.

4. In a rotary cutter for dredging-machines, having an inner drum with a reservoir communicating with the suction-pipe, and a rotating outer drum, the perforated spirally-arranged series of buckets E, carried by said outer drum, each bucket extending the entire length of the face of the drum, substantially as herein described.

5. In a rotary cutter for dredging-machines in which an outer rotating drum carries the buckets, an inner drum on which the outer drum rotates, and provided with a reservoir communicating with the suction-pipe, said inner drum being adapted to have a rotary adjustment, substantially as and for the purpose herein described.

6. In a rotary cutter for dredging-machines, the suction-pipe A and the outer rotating drum, D, carrying the buckets E, in combination with the inner drum, B, having a reservoir, C, communicating with the suction-pipe, said inner drum being adapted to have a rotary adjustment on the suction-pipe, substantially as herein described.

7. In a rotary cutter for dredging-machines, the suction-pipe A and the outer rotating drum, D, carrying the buckets E, in combination with the inner drum, B, having a reservoir, C, communicating with the suction-pipe, and a mechanism by which said drum is given a rotary adjustment, consisting of the gear H on the drum, the pinion G, and the shaft $g$, communicating inboard, substantially as herein described.

In witness whereof I have hereunto set my hand.

JOHN H. BOLLES.

Witnesses:
JAMES L. KING,
WALTER N. KEMPSTON.